United States Patent [19]

Taurog

[11] Patent Number: 5,605,063
[45] Date of Patent: Feb. 25, 1997

[54] STEERING WHEEL RESTRAINT

[76] Inventor: Avraham Taurog, 1445 Carroll St., Brooklyn, N.Y. 11213

[21] Appl. No.: 515,992

[22] Filed: Aug. 16, 1995

[51] Int. Cl.[6] ................................................. B60R 25/02
[52] U.S. Cl. ............................... 70/209; 70/226; 70/212
[58] Field of Search ............................. 70/211, 212, 237, 70/238, 209, 225, 226

[56] References Cited

U.S. PATENT DOCUMENTS

| D. 350,274 | 9/1994 | Baker | D8/331 |
|---|---|---|---|
| 4,750,341 | 6/1988 | Laguna | 70/209 |
| 5,275,030 | 1/1994 | Cole | 70/209 |
| 5,353,614 | 10/1994 | Anderson | 70/209 |
| 5,537,847 | 7/1996 | Dalton et al. | 70/209 |

Primary Examiner—Darnell M. Boucher
Attorney, Agent, or Firm—Natter & Natter

[57] ABSTRACT

A steering wheel restraint for providing a vehicle theft deterrent has interfitting steel cover members adapted for placement over the steering wheel to disable the steering function. An externally mounted removable locking device is housed within a protector ring that is mounted to one of the cover members. A marginal flange of the cover members is coincidental to a peripheral rim of the steering wheel and provides a protective shield to prevent cutting of the rim. A rotation restrictor flap concealable behind the cover member is extendible for contact with an interior surface of the vehicle to thereby block rotation of the cover members. A stabilizer tab is concurrently projectible into the path of movement of a spoke of the wheel to prevent wheel rotation independently of the cover members. The components can be readily disassembled and the rotation restrictor flap and stabilizer tab can be displaced to a compact space-saving inactive position for storage.

8 Claims, 3 Drawing Sheets

STEERING WHEEL RESTRAINT

BACKGROUND OF THE INVENTION

1. Field of the Invention

This invention relates to security devices and especially to an anti-theft device for vehicles.

In particular, the steering wheel restraint of this invention concerns a locking device for functionally disabling the steering wheel of an automobile.

2. Background Art

Conventional steering wheel locking devices for combatting automobile theft generally include an elongated bar secured across the steering wheel and extending radially beyond the periphery of the wheel rim for blocking or otherwise limiting rotational movement. Typical devices are shown in U.S. Pat. No. 5,353,614 and U.S. Pat. No. Des. 350,274. Another version of this type of locking device is shown in U.S. Pat. No. 4,750,341 and utilizes a generally circular peripheral member that is attached to the steering wheel rim.

A variation to these locking devices includes a set of extendable locking bars having a hook at one end placed around a brake pedal arm and a hook at the other end that is attached to the rim of a steering wheel.

An inherent weakness of these locking devices is that the steering wheel rim can be easily, quickly and quietly severed with a hack saw, bolt cutter or similar tool and the locking member can be readily removed.

Another shortcoming of devices utilizing elongated bars is that the bars can be cut, e.g. with a saw, to effectively release the rotation blocking action.

A further deficiency found in many of the currently available locking devices such as shown in U.S. Pat. No. 5,353,614 and U.S. Pat. No. 5,275,030, is that the lock mechanism is not shielded and is exposed to attack. For example, a spray refrigerant such as Freon when applied to the lock mechanism can cause the metal to become brittle so that it will fracture upon impact when struck by a hammer or similar tool.

Another problem found among steering wheel locking devices, especially those devices mounted over the hub of a steering wheel, e.g. as shown in U.S. Pat. No. 5,275,030, is that current model automobiles generally include an air bag mounted within the hub which necessitates modified configurations for the steering wheel locks and imposes limitations on universal applicability.

Another disadvantage of the currently available steering wheel locks is that they are cumbersome and unwieldy because of their overall length dimension and are not designed for disassembly or compact storage.

BRIEF DESCRIPTION OF THE INVENTION

The nature of this invention concerns a steering wheel restraint for deterring automobile theft by blocking or otherwise limiting rotational movement of the wheel.

Briefly, the steering wheel restraint of this invention includes a protective encasement for a steering wheel assembly having a wheel hub and a peripheral wheel rim connected to the hub by a plurality of wheel spokes.

The protective encasement is provided by interfitting cover members adapted to overlie the steering wheel assembly. A marginal flange of the cover members is coincidental to the peripheral rim and provides a protective shield to prevent cutting of the rim. A rotation restrictor flap concealable behind the cover members is extendable for contact with an interior surface of the vehicle to thereby block rotation of the cover members. A stabilizer tab is operatively positionable for contact with the wheel spoke to prevent wheel rotation independent of the cover member.

The cover members are secured in an operative mode by a lock mechanism housed within a protector ring.

An advantage of the steering wheel restraint of this invention is that the wheel rim is encased by the cover members.

Another feature of the steering wheel restraint of this invention is that the rotation restrictor flap is positioned behind the steering wheel.

A further aspect of the steering wheel restraint of this invention is that the stabilizer tab is displaceable into an operative mode concurrently with actuation of the rotation restrictor flap.

In view of the foregoing, it should be apparent that the steering wheel restraint of the present invention overcomes many of the problems, shortcomings and disadvantages of the previously discussed steering wheel locking devices.

Having thus summarized the invention, it will be seen that it is a preferred object thereof to provide a steering wheel restraint of the general character described herein which is not subject to the aforementioned deficiencies.

Another preferred object of this invention is to provide a steering wheel restraint wherein the wheel rim is protected from attack.

A further preferred object of this invention is to provide a steering wheel restraint wherein the rotation restrictor flap does not project beyond the periphery of the wheel rim and is not readily accessible for tampering.

A still further preferred object of this invention is to provide a stabilizer tab for preventing rotation of the steering wheel independently of the cover members.

Yet another preferred object of this invention is to provide a steering wheel restraint that is accommodatable with steering wheel assemblies having hub mounted air bags.

Still another preferred object of this invention is to provide a steering wheel restraint that can be easily disassembled for compact storage.

Yet another preferred object of this invention is to provide a steering wheel restraint that is practical to use, reliable in operation, simple in design and economical to manufacture.

With these ends in view, the invention finds embodiment in certain combinations of elements, arrangements of components by which the aforementioned preferred objects, features, advantages, and certain other aspects, features and considerations are attained, all with reference to the accompanying drawings and the scope of which are more particularly pointed out and indicated in the appended claims.

BRIEF DESCRIPTION OF THE DRAWINGS

In the accompanying drawings, in which is shown an exemplary embodiment of the invention.

BRIEF DESCRIPTION OF THE INVENTION

Figure 1:
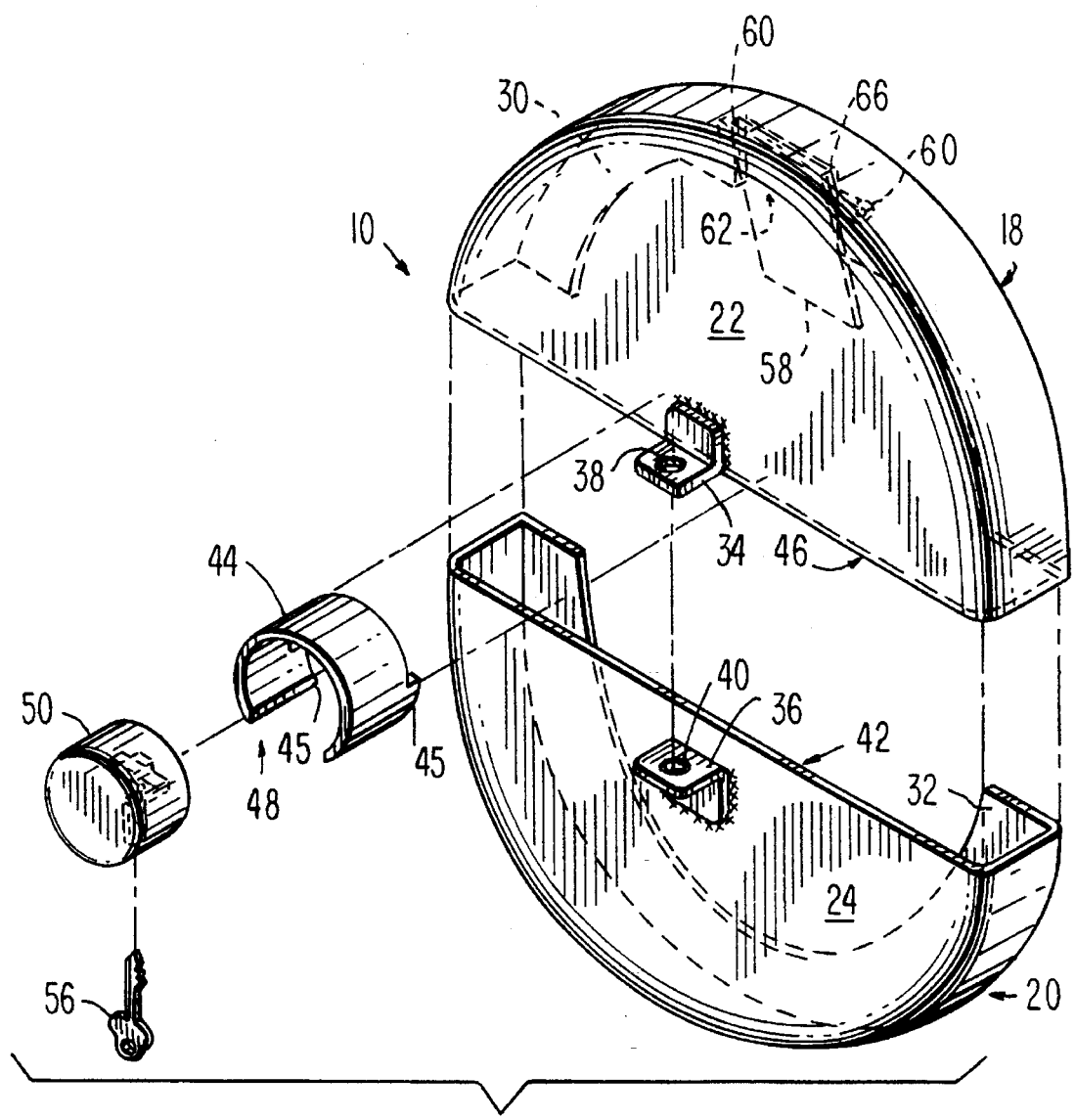
FIG. 1 is an exploded perspective view showing a set of interfitting cover members including rotation restrictor flap and stabilizer tab mounted thereto and further illustrating a lock mechanism housed within a protector ring.

With specific reference now to the drawings, it is stressed that the particulars shown and described herein are for the purpose of illustrative discussion of the invention and are presented in the cause of providing what is believed to be the most useful and readily understood description of the principles and conceptual aspects of this invention. In this regard, no attempt has been made to show the invention in more detail than is necessary for a fundamental understanding however, the description in combination with the drawings should make apparent to those skilled in the art how the invention may be applied in practice.

Referring now in detail to the drawings, the reference numeral 10 denotes generally a steering wheel restraint in accordance with this invention.

The steering wheel restraint 10 is intended to protectively encase and functionally disable a steering wheel assembly including a wheel rim 12 and a wheel hub 14 having a plurality of spokes 16 extending between the hub 14 and the rim 12.

Figure 2:
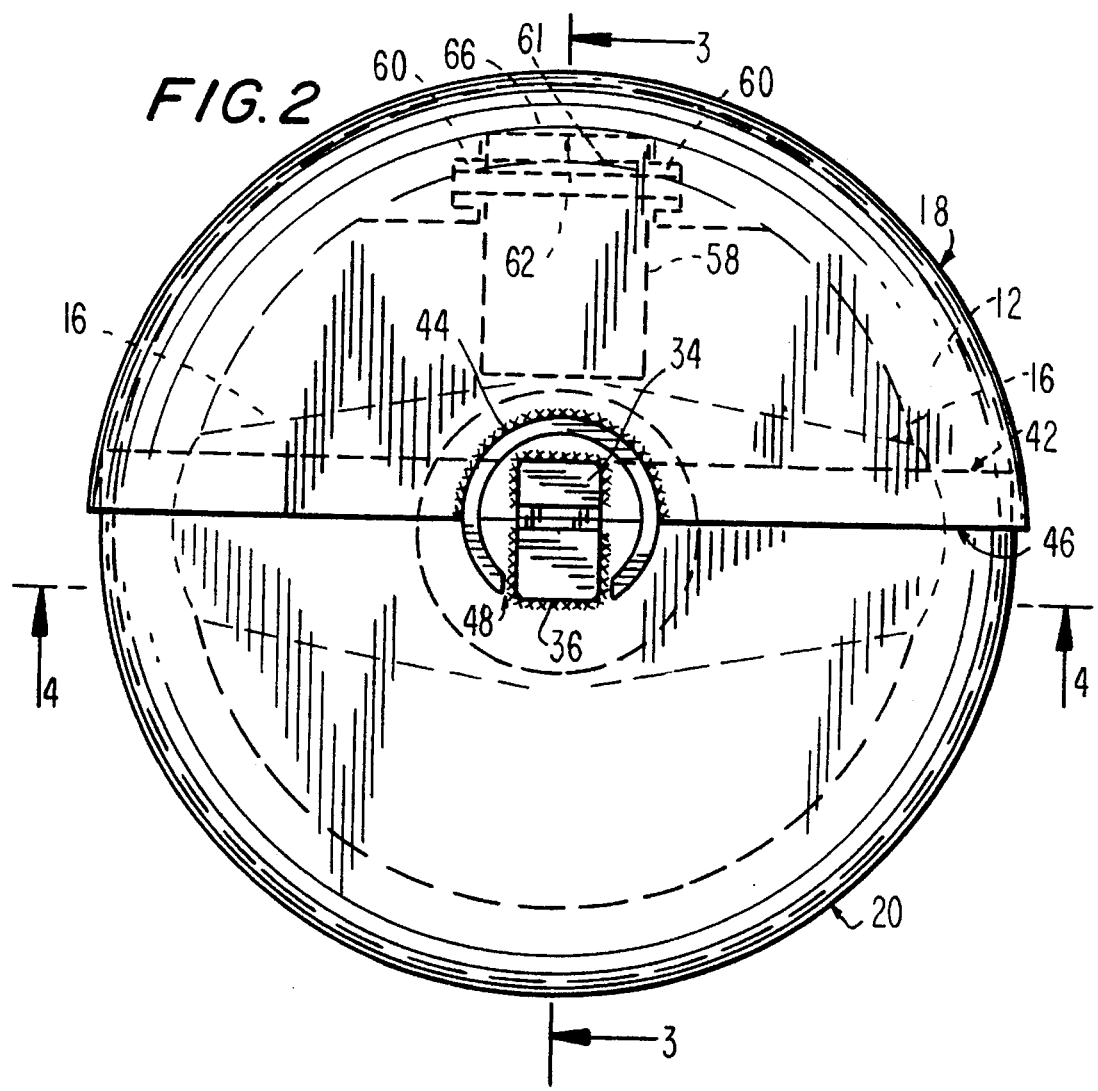
FIG. 2 is a plan view showing the cover members in interfitting relationship further illustrating welded attachment of the protector ring to one of said cover members and the placement of a set of bolt-receiving angle members on the respective cover members.
Figure 4:
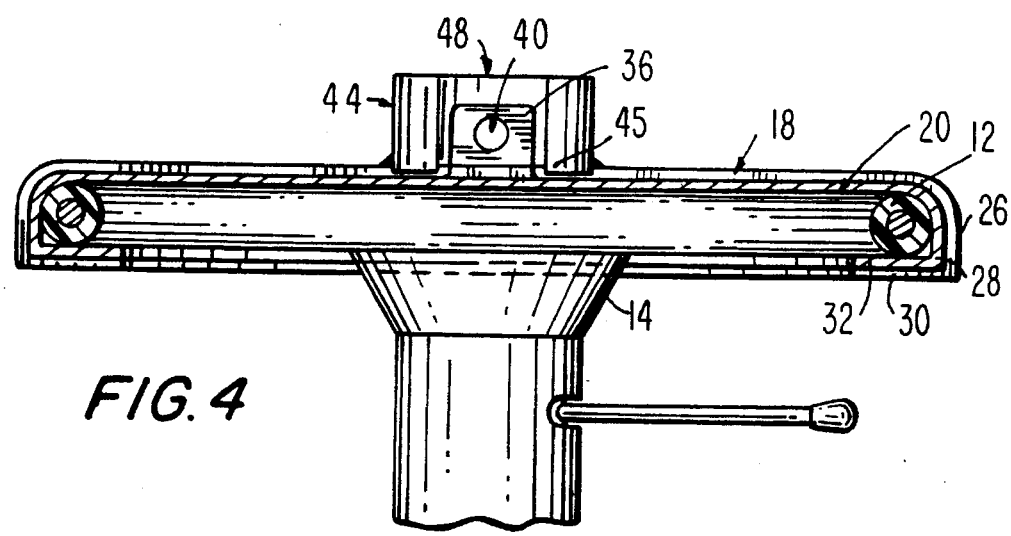
FIG. 4 is a sectional view taken substantially along line 4—4 of FIG. 3 showing a flange portion of the cover member surrounding the wheel rim and the angle members within the protector ring positioned for accommodating the lock mechanism.

The steering wheel restraint 10 includes an upper cover member 18 and a complementary lower cover member 20. Each of the cover members 18, 20, preferably has a substantially planar face 22, 24, and a flange defined respectively by a curved edge 26, 28 and a lip portion 30, 32. The respective curved edges 26, 28 and the lip portions 30, 32, are adapted to substantially surround the wheel rim 12. The cover members 18, 20 are dimensioned for interfitting engagement as shown in FIG. 2. By way of example, the cover members 18, 20 may be fabricated of steel plate or sheet metal material.

It should be noted that a semi-circular configuration of the cover members 18, 20 has been selected for minimizing materials required and for conforming to the overall contour of the rim 12 and for accommodation of a hub mounted air bag. However, it should be understood that other shapes may be selected, for example, the semi-circular configuration can be modified to a truncated segment formed by a chord intersecting the circumference to expose an upper and lower portion of the rim 12. This last-mentioned configuration provides space and weight saving benefits. Although the exposed portion of the rim 12 may be subject to attack, security is not compromised for the reason that the cover members 18, 20 can not be removed from the rim 12 and the spokes 16 will block the rim 12 from rotational displacement.

A set of steel angle members 34, 36 are each attached to the respective cover members 18, 20 as for example, by welding. An upstanding leg of each angle member 34, 36 is provided with an aperture 38, 40, respectively. It should also be observed that the angle member 36 attached to the lower cover member 20 is offset from a terminal edge 42 in order to compensate for overlap when the lower cover member 20 is seated within the upper cover member 18, as shown in FIG. 2. The angle members 34, 36 are designed such that they will be in contiguous relationship, with the apertures 38, 40 aligned, when the cover members 18, 20 are interfit as in FIG. 2.

Figure 3:
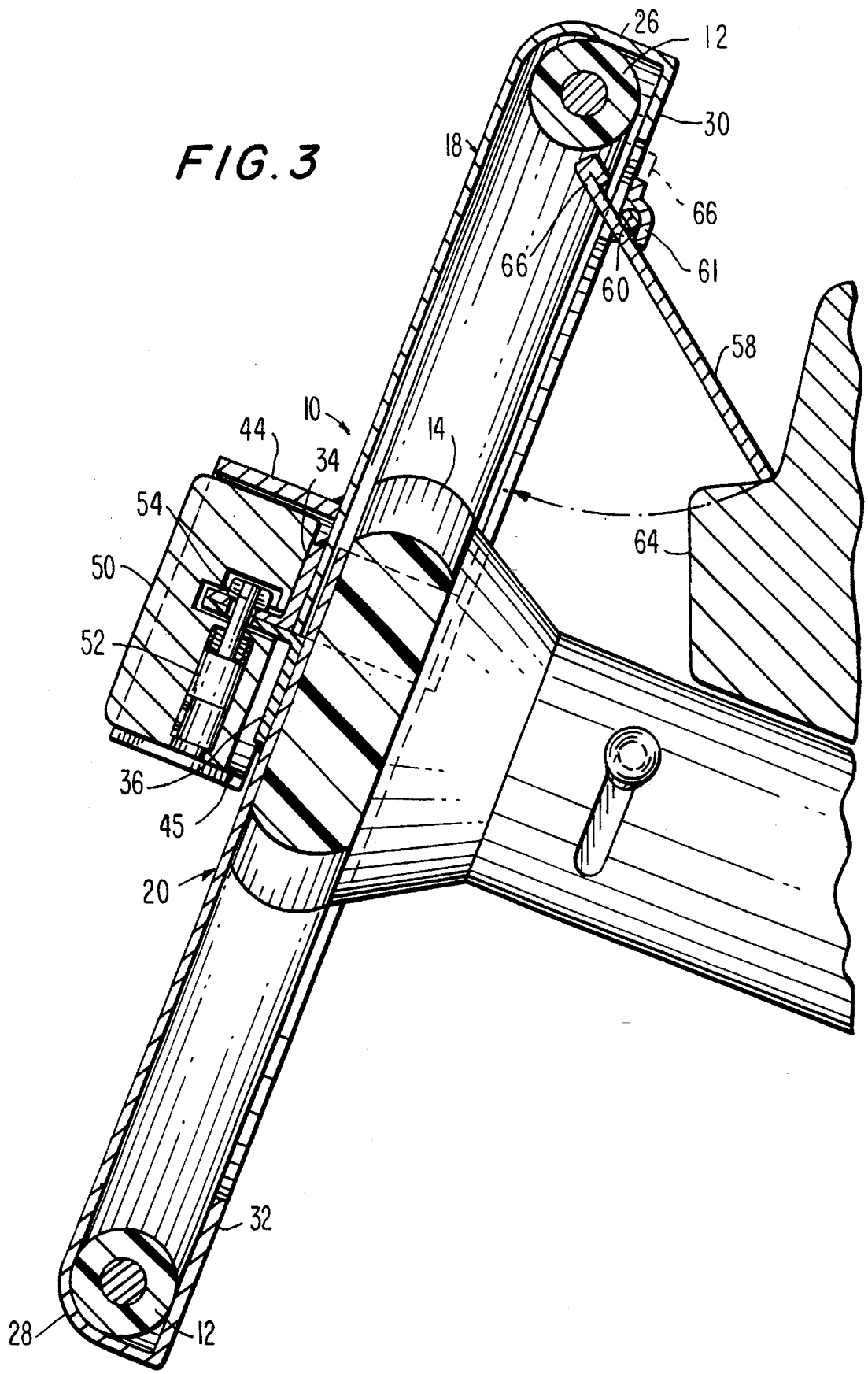
FIG. 3 is a sectional view to an enlarged scale, taken substantially along line 3—3 of FIG. 2 showing the steering wheel restraint of this invention lockably secured to the steering wheel assembly with the rotation restrictor flap and the stabilizer tab in an operative mode.

A protector ring 44 is attached along a portion of its circumference to the upper cover member 18 as by welding (see FIG. 2) and projects beyond a terminal edge 46 of the cover member 18. The portion of the ring 44 overlying the lower cover member 20 extends below the face 22 a distance approximating the thickness of the face 22 to form a barrier 45 as best shown in FIGS. 1 and 3. The barrier 45 protects against possible prying action with a screw driver or similar tool. It should also be noted that the protector ring 44 has a slotted opening 48 for accommodating the angle member 36.

The protector ring 44 is adapted to accommodate a removable button lock 50 such as manufactured by American Lock Co. (Series 2000 Padlock). The button lock 50 includes a lock cylinder 52 and a locking bolt 54 which is operated by a key 56. The slotted opening 48 provides key access to the button lock 50. The locking bolt 54 is displaceable through the apertures 38, 40 for lockably securing the cover members 18, 20 to the rim 12.

Considering next the components for immobilizing the steering wheel, a rotation restrictor, preferably in the form of a flap 58, is secured by a hinge mounting 60 within a recess 62 formed in the lip portion 30. The hinge mounting 60 urges the restrictor flap 58 away from the cover face 22 for contact with an interior surface 64 of the automobile. A rotation stop member 61, such as an arcuate element welded in overlying relationship to the hinge 60 limits the swingable displacement of the restrictor flap 58 in a counterclockwise direction (as viewed in FIG. 3). It should be noted that displacement of the restrictor flap 58 in a clockwise direction would be blocked by the interior surface 64. Alternatively, the restrictor flap 58 can be welded in the operative position or otherwise formed as an integral member.

A stabilizer tab 66 is employed to prevent independent rotational movement of the rim 12 within the cover members 18, 20. The stabilizer tab 66, in this preferred embodiment, is formed as a tail portion of the restrictor flap 58 and is pivotly displaceable about the hinge mounting 60 toward the cover face 22. It should be apparent that the stabilizer tab 66 will be operatively positioned concurrently with the actuation of the restrictor flap 58 to block displacement of the spokes 16 within the cover members 18, 20.

It should also be observed that when it is desired to release the steering wheel restraint 10, the button lock 50 can be removed from within the protector ring 44, and the respective cover members 18 and 20 can be slidably separated and stored for future use.

Consistent with the storage features of the steering wheel restraint 10, the restrictor flap 58 is displaceable, against the biasing force of the hinge mounting 60 (as indicated by the broken-line as shown in FIG. 3) to an alternate space-saving mode and can be held in this position by a latch or other similar fastener (not shown).

It should thus be apparent that there is provided a steering wheel restraint which achieves various preferred objects of this invention and which is well adapted to meet conditions of practical use.

Since other possible embodiments might be made of the present invention or modifications might be made to the exemplary embodiments set forth, it is to be understood that all materials shown and described in the accompanying drawings are to be interpreted as illustrative and not in a limiting sense.

Having thus described the invention, there is claimed as new and desired to be secured by Letters Patent:

1. A steering wheel restraint for providing a vehicle theft deterrent wherein the steering wheel structure includes a steering column terminating at a hub, at least one wheel spoke radiating from the hub and terminating at a wheel rim, said wheel restraint comprising complimentary cover members adapted for lockable engagement over the steering wheel, said cover members having a substantially planar face overlying the hub and the wheel spoke and further including a peripheral flange substantially surrounding the wheel rim, restriction means for preventing rotational movement of the cover members, said restriction means including a flap member pivotally mounted to the peripheral flange of one of said cover members and resiliently displaceable rearwardly with respect to the face of the cover members for abutment with an interior surface of the vehicle independent of the steering wheel structure, said flap member being within a marginal area defined by and underlying the wheel rim.

2. A steering wheel restraint as claimed in claim 1 further including spoke stabilizer means for preventing rotary movement of the wheel rim within the cover members, said spoke stabilizer means being simultaneously actuatable with the flap member and protectable into the travel path of the wheel spoke.

3. A steering wheel restraint as claimed in claim 1 further including locking means comprising complimentary angle members mounted to the planar face of the respective cover members, each of said angle members defining an aperture, said respective apertures adapted for registered alignment when the cover members are assembled in an interfitting relationship, a ring member secured to the face of one of said cover members, said ring member substantially surrounding the corresponding angle member to provide a protective barrier, said ring member further being adapted to accommodate the other of said angle members to provide a lock receptacle, a removable lock member accommodatable within the lock receptacle, said lock member having a bolt, said bolt being selectively actuatable for entry through the aligned apertures to secure the cover members in lockable engagement.

4. A steering wheel restraint as claimed in claim 3 wherein the protective barrier defines a slotted opening for slidably accommodating the other of said angle members, said slotted opening further providing key access to the lock member.

5. A steering wheel restraint as claimed in claim 2 wherein the spoke stabilizer means includes a tab member formed integrally with the flap member and operably positionable concurrently with actuation of the flap member.

6. A steering wheel restraint as claimed in claim 1 further including stop means for limiting pivotal displacement of the flap member.

7. A steering wheel restraint as claimed in claim 1 wherein the flap member is pivotally displaceable forwardly with respect to the base of the cover member when in a space-saving storage mode.

8. A steering wheel restraint as claimed in claim 1 wherein the cover members have a semi-circular configuration and define a diametric edge with the respective diametric edges of said cover members being in confronting overlapped relationship when lockably engaged.

* * * * *